(12) United States Patent
Liu et al.

(10) Patent No.: US 10,530,043 B2
(45) Date of Patent: Jan. 7, 2020

(54) ANTENNA AND MOBILE TERMINAL INCLUDING THE SAME

(71) Applicant: AAC Technologies Pte. Ltd., Singapore (SG)

(72) Inventors: Feng Liu, Shenzhen (CN); Jingqiang Luo, Shenzhen (CN); Yongsheng Peng, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 172 days.

(21) Appl. No.: 15/828,828

(22) Filed: Dec. 1, 2017

(65) Prior Publication Data

US 2018/0375195 A1 Dec. 27, 2018

(30) Foreign Application Priority Data

Jun. 22, 2017 (CN) .......................... 2017 1 0482344

(51) Int. Cl.
*H01Q 1/24* (2006.01)
*H01Q 5/30* (2015.01)
*H01Q 9/40* (2006.01)
*H01Q 13/10* (2006.01)
*H01Q 1/38* (2006.01)
*H01Q 1/48* (2006.01)
*H04M 1/02* (2006.01)
*H04B 1/38* (2015.01)
(Continued)

(52) U.S. Cl.
CPC .............. *H01Q 1/243* (2013.01); *H01Q 1/38* (2013.01); *H01Q 1/48* (2013.01); *H01Q 5/328* (2015.01); *H01Q 5/364* (2015.01); *H01Q 9/40* (2013.01); *H01Q 9/42* (2013.01); *H01Q 13/10* (2013.01); *H04B 1/38* (2013.01); *H04M 1/026* (2013.01); *H01Q 21/28* (2013.01); *H04M 1/0264* (2013.01); *H04M 1/725* (2013.01)

(58) Field of Classification Search
CPC .......... H01Q 1/24; H01Q 1/241; H01Q 1/242; H01Q 1/243; H01Q 5/307; H01Q 5/328; H01Q 5/364
See application file for complete search history.

(56) References Cited

U.S. PATENT DOCUMENTS

| | | | | |
|---|---|---|---|---|
| 8,150,457 | B2* | 4/2012 | Kobayashi | H01Q 1/243 455/556.1 |
| 8,482,467 | B2* | 7/2013 | Jarvis | H01Q 1/243 343/700 MS |
| 10,290,925 | B2* | 5/2019 | Huang | H01Q 5/10 |

* cited by examiner

*Primary Examiner* — Daniel Munoz
*Assistant Examiner* — Patrick R Holecek
(74) *Attorney, Agent, or Firm* — IPro, PLLC; Na Xu

(57) ABSTRACT

An antenna includes a metal frame including a radiation frame with a first grounding point, and a grounding frame separated from the radiation frame; a mainboard including a system ground and a feeding end, the system ground including a first and second ground point; a diversity antenna unit including a feeding point and a second grounding point; and a conductive bracket; a front-facing camera is mounted on the mainboard; a gap is between the radiation frame and the grounding frame, the first ground point and the second ground point are at two opposite sides of the camera, respectively; the feeding point is connected with the feeding end, the second grounding point is connected with the system ground; one end of the conductive bracket is connected with the first ground point, and the other end is connected with the second ground point, so that the conductive bracket crosses the camera.

9 Claims, 5 Drawing Sheets

(51) Int. Cl.
*H01Q 5/328* (2015.01)
*H01Q 5/364* (2015.01)
*H01Q 9/42* (2006.01)
 H04M 1/725 (2006.01)
 H01Q 21/28 (2006.01)

ANTENNA AND MOBILE TERMINAL INCLUDING THE SAME

TECHNICAL FIELD

The present disclosure relates to the field of communication technologies and, particularly, to an antenna and a mobile terminal including the antenna.

BACKGROUND

At present, a mobile terminal includes a mainboard, an antenna and a front-facing camera, the antenna is connected with the mainboard to transmit and receive electromagnetic wave signals, and the front-facing camera is also connected with the mainboard to achieve a camera-shooting function. However, when the mobile terminal is working, the front-facing camera generates a stray resonance, which causes interference to radiation of the antenna, resulting in a poor antenna performance.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

REFERENCE SIGNS

10—front-facing camera;
11—rear-facing camera;
100—metal frame;
  100a—gap;
  110—radiation frame;
    111—first grounding point;
  120—grounding frame;
200—mainboard;
  210—first ground point;
  220—second ground point;
  230—third ground point;
300—diversity antenna unit;
  310—feeding point;
  320—second grounding point;
400—conductive bracket;
  410—strip-like section;
  420—first connecting section;
  430—second connecting section;
500—first spring pin;
600—second spring pin.

The drawings herein are incorporated into and constitute a part of the present specification, which show the embodiments of the present disclosure and illustrate the principles of the present disclosure together with the specification.

DESCRIPTION OF EMBODIMENTS

The present disclosure will be further illustrated with reference to the accompanying drawings and embodiments.

Figure 1:
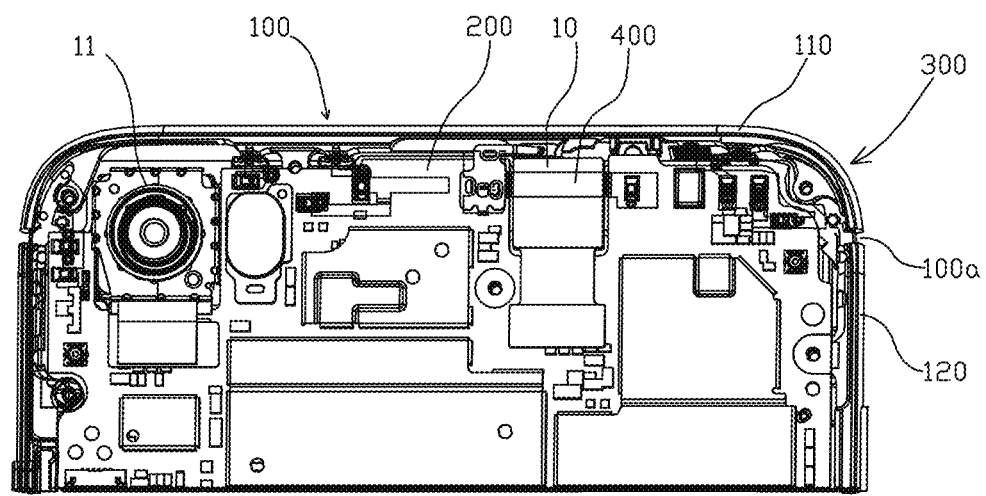
FIG. 1 is a structural schematic view of a portion of a mobile terminal in accordance with an exemplary embodiment provided by the present disclosure.
Figure 2:
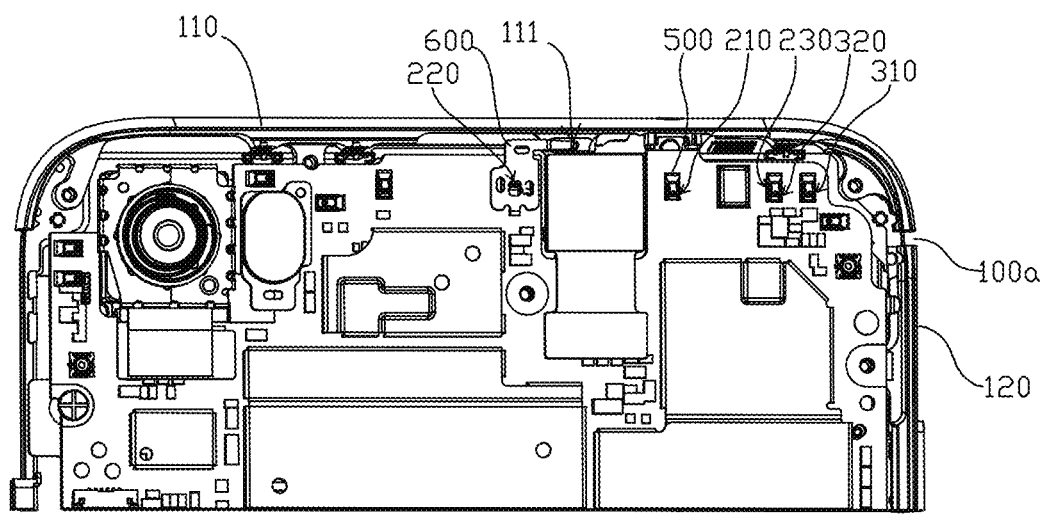
FIG. 2 is another structural schematic view of a portion of a mobile terminal in accordance with an exemplary embodiment provided by the present disclosure.
Figure 3:
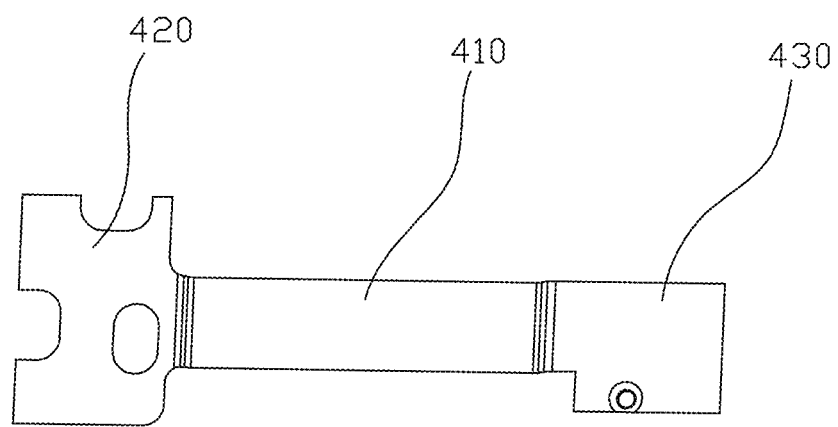
FIG. 3 is a structural schematic view of a conductive bracket of an antenna in accordance with an exemplary embodiment provided by the present disclosure.

As shown in FIGS. 1—3, the present disclosure provides an antenna of a mobile terminal, the antenna can transmit and receive electromagnetic wave signals so as to achieve a communication function of the mobile terminal. Specifically, the mobile terminal may be a cellphone, a tablet computer and the like. Generally, the mobile terminal includes a front-facing camera 10 and a rear-facing camera 11, and both the front-facing camera 10 and the rear-facing camera 11 can achieve a camera-shooting function, so as to meet the user's camera-shooting needs.

The antenna provided by an exemplary embodiment of the present disclosure may include a metal frame 100, a mainboard 200, a diversity antenna unit 300 and a conductive bracket 400.

The metal frame 100 includes a radiation frame 110 and a grounding frame 120 separately arranged from the radiation frame 110, a gap 100a is provided between the radiation frame 110 and the grounding frame 120. Specifically, the radiation frame 110 is formed as a strip-like structure, the radiation frame 110 has two opposite ends, and the gap 100a is formed respectively between one end of the radiation frame 110 and the grounding frame 120 and between the other end of the radiation frame 110 and the grounding frame 120. The gap 100a can improve radiation performance of the frame 110. Optionally, a width of the gap 100a can be 1.5 mm, in this case, the width is in a direction from the radiation frame 110 to the grounding frame 120. In addition, the radiation frame 110 has a first grounding point 111, and the radiation frame 110 achieves grounding by the first grounding point 111.

The mainboard 200 includes a system ground and a feeding end, the front-facing camera 10 is mounted at the mainboard 200, and then a working state of the front-facing camera 10 can be controlled by the mainboard 200. The system ground has a first ground point 210 and a second ground point 220, the first ground point 210 and the second ground point 220 are respectively located at two opposite sides of the front-facing camera 10. Optionally, the mainboard 200 can adopt a flexible printed circuit (Flexible Printed Circuit, FPC) board.

The diversity antenna unit 300 has a feeding point 310 and a second grounding point 320, the feeding point 310 is connected with the feeding end of the mainboard 200, so that the diversity antenna unit 300 can achieve feeding by an electrical connection between the feeding point 310 and the feeding end. The second grounding point 320 is connected with the system ground of the mainboard 200, so that the whole diversity antenna unit 300 can achieve grounding by the second grounding point 320, and the radiation performance of the diversity antenna unit 300 can be improved. The diversity antenna unit may include a metal ring, and the second grounding point 320 is provided on the metal ring, so that the metal ring can be connected with the system ground by the second grounding point 320.

Two ends of the conductive bracket 400 are respectively connected with the first ground point 210 and the second ground point 220 of the mainboard 200, so that the conductive bracket 400 can cross the front-facing camera 10. The conductive bracket 400 is connected with the system ground after one end of the conductive bracket 400 is connected with the first ground point 210, in a same way, the conductive bracket 400 is also connected with the system ground after the other end of the conductive bracket 400 is connected with the second ground point 220.

When applying the above-mentioned antenna, the conductive bracket 400 can cross the front-facing camera 10 and be connected at two opposite sides of the front-facing camera 10, and the two opposite sides of the conductive bracket 400 are respectively connected with the system ground of the mainboard 200, so that the conductive bracket 400 can play a role of shielding, and thus a stray resonance generated by the front-facing camera 10 can be weakened, thereby improving performance of the antenna.

In general, the front-facing camera 10 can be arranged along a length direction of the mobile terminal, that is, the front-facing camera 10 has two ends, one end of the front-facing camera 10 is closer to the radiation frame 110 than the other end of the front-facing camera 10 is. For ease of description, the end of the front-facing camera 10 closer to the radiation frame 110 is denoted as a top end, the other end is denoted as a bottom end, and a portion between the top end and the bottom end can be denoted as a middle portion. In this case, the conductive bracket 400 can be arranged at one of the top end, the bottom end and the middle portion of the front-facing camera 10. Optionally, the conductive bracket 400 can also cover the top end and the middle portion of the front-facing camera 10 or cover the bottom end and the middle portion of the front-facing camera 10.

Optionally, in a thickness direction of the mainboard 200, the conductive bracket 400 is arranged opposite to the top end of the front-facing camera 10. That is, the whole conductive bracket 400 is arranged according to a portion of the front-facing camera 10 closer to the radiation frame 110, so that the stray resonance generated by the front-facing camera 10 can be weakened, thereby significantly improving performance of the antenna.

For further enhancing an effect of the conductive bracket 400, as shown in FIG. 3, the conductive bracket 400 provided by an exemplary embodiment of the present disclosure may include a strip-like section 410, and further includes a first connecting section 420 and a second connecting section 430. Two ends of the strip-like section 410 are connected with the mainboard 200 respectively by the first connecting section 420 and the second connecting section 430. In the thickness direction of the mainboard 200, a projection of the strip-like section 410 overlaps with a projection of the top end of the front-facing camera 10, and a projection of the first connecting section 420 and the second connecting section 430 does not overlap with the projection of the front-facing camera 10. Specifically, the strip-like section 410 can be formed as a rectangular structure, a width of the strip-like section 410 can be 2 mm, so as to optimize the effect of the conductive bracket 400. In addition, a width of the first connecting section 420 and a width of the second connecting section 430 can be slightly larger than the width of the strip-like section 410, so as to increase a connecting area between the conductive bracket 400 and the mainboard 200, thereby enhancing connecting strength between the conductive bracket 400 and the mainboard 200.

In an exemplary embodiment, an extending direction of the strip-like section 410 may be parallel to a width direction of the mobile terminal. That is, the strip-like section 410 extends along the width direction of the mobile terminal. Generally, since a width direction of the front-facing camera 10 is parallel to the width direction of the mobile terminal, a configuration of the strip-like section 410 will be more disciplinary when the strip-like section 410 extends along the width direction of the mobile terminal, which will help to control a suppression range by the strip-like section 410 on the stray resonant generated by front-facing camera 10. Meanwhile, such a structure can further simplify structure and processing of the antenna, thereby further reducing cost of the antenna.

For facilitating the connection between the conductive bracket 400 and the first ground point 210, as shown in FIG. 2, the antenna provided by an exemplary embodiment of the present disclosure further includes a first spring pin 500, and the conductive bracket 400 is connected with the first ground point 210 by the first spring pin 500. In this case, the first spring pin 500 can enhance connecting strength between the conductive bracket 400 and the first ground point 210, so that the conductive bracket 400 can be more reliably connected with the mainboard 200. Optionally, the conductive bracket 400 can be made by adopting a laser direct structuring (Laser Direct Structuring, LDS) technique.

Further, one end of the first spring pin 500 welded at the first ground point 210, and the other end of the first spring pin 500 is welded at the conductive bracket 400. When the first spring pin 500 is connected with the mainboard 200 by welding, the connecting strength therebetween will be stronger, and an assembling process of the antenna will be relatively simple since the welding operation is easier to implement. Optionally, the first spring pin 500 can also be connected with the mainboard 200 by adopting other connection manners.

Similarly, as shown in FIG. 2, the antenna provided by an exemplary embodiment of the present disclosure further includes a second spring pin 600, and the conductive bracket 400 is connected with the second ground point 220 by the second spring pin 600, and the second spring pin 600 is connected with the first grounding point 111. The second spring pin 600 can enhance connecting strength between the conductive bracket 400 and the second ground point 220, and the second spring pin 600 can further achieve a connection between the first grounding point 111 and the system ground. As a result, when adopting the second spring pin 600, there is no need to provide other structures to achieve the connection between the first grounding point 111 and the system ground, so that the antenna will include fewer parts and occupy less space, which facilitates arrangement of rest parts of the mobile terminal.

Furthermore, one end of the second spring pin 600 can be connected with the conductive bracket 400 by hot-melting, and the other end is respectively connected with the first grounding point 111 and the mainboard 200. When the second spring pin 600 is connected with the conductive bracket 400 by hot-melting, the connecting strength therebetween will be stronger, and an assembling process of the antenna will be relatively simple since the hot-melting operation is easier to implement. Optionally, the second spring pin 600 can also be connected with the conductive bracket 400 by adopting other connection manners.

For improving the radiation performance of the antenna provided by an exemplary embodiment of the present disclosure, the antenna may further include a tuning switch (not shown in the figures), the system ground of the mainboard 200 includes a third ground point 230, the radiation frame 110 is connected with the third ground point 230 by the tuning switch, and the second grounding point 320 is connected with the third ground point 230. That is, the diversity antenna unit 300 is connected with the third ground point 230 by the tuning switch. By providing the tuning switch, each frequency band of the diversity antenna unit 300 can be adjusted by grounding and coupling, so as to adapt to different application scenarios of the mobile terminal, and thus the entire antenna can perform the best in a corresponding application scenario.

Specifically, when the diversity antenna unit 300 includes the metal ring, the metal ring is connected with the tuning switch, so that each frequency band of the diversity antenna unit 300 can be switched by the tuning switch.

When adopting the above-mentioned antenna, a low frequency band of the antenna reach 790-960 MHz, and a high frequency band of the antenna can reach 1710-2690 MHz.

Figure 4:
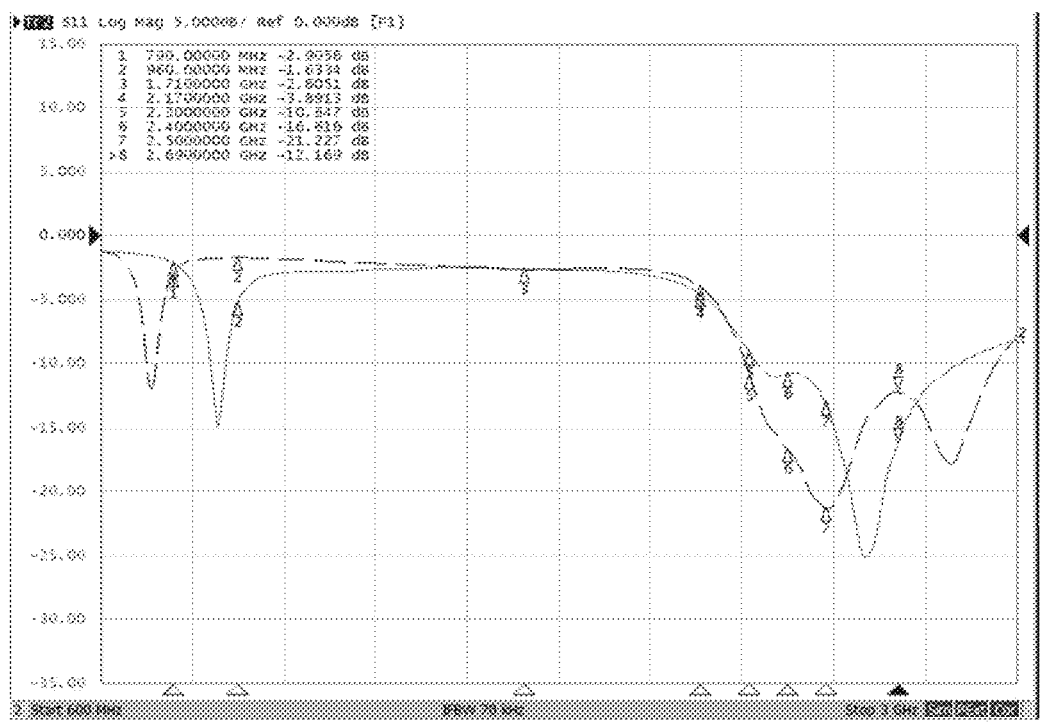
FIG. 4 is graph showing comparison of return loss between an antenna in accordance with an exemplary embodiment provided by the present disclosure and an antenna in accordance with the prior art.
Figure 5:
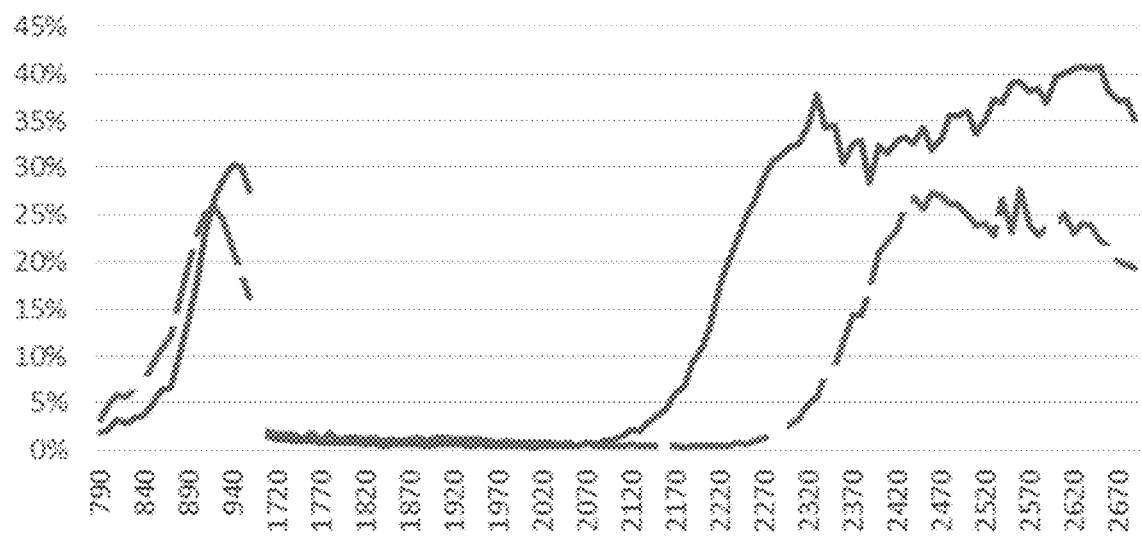
FIG. 5 is graph showing comparison of antenna efficiency between an antenna in accordance with an exemplary embodiment provided by the present disclosure and an antenna in accordance with the prior art.

FIG. 4 shows return loss of the antenna provided with the conductive bracket 400 (antenna provided by embodiments of the present disclosure) and return loss of the antenna not provided with the conductive bracket 400 (antenna in the prior art). The solid line refers to the case in which the antenna is provided with the conductive bracket 400, and the dotted line refers to the case in which the antenna is not provided with the conductive bracket 400. FIG. 5 shows antenna efficiency of the antenna provided with the conductive bracket 400 and antenna efficiency of the antenna not provided with the conductive bracket 400. The solid line refers to the case in which the antenna is provided with the conductive bracket 400, and the dotted line refers to the case in which the antenna is not provided with the conductive bracket 400. As shown in FIG. 4, an absolute value of the return loss of the antenna will be increased when the antenna is provided with the conductive bracket 400, and thus the performance of the antenna is improved. As shown in FIG. 5, when the antenna is provided with the conductive bracket 400, the antenna efficiency is improved, thus the radiation performance is improved accordingly.

Base on the above-mentioned antenna, a mobile terminal is provided in accordance with an exemplary embodiment of the present disclosure, and the mobile terminal includes the antenna as described in any one of the above-mentioned embodiments.

The above description only shows optional embodiments of the present disclosure and is not intended to limit the present disclosure. Various replacements and modifications may be made by those skilled in the art. Any modifications, equivalent replacements, improvements and the like made within the spirit and principles of the present disclosure should be included in the protection scope of the present disclosure.

What is claimed is:

1. An antenna of a mobile terminal, the mobile terminal comprising a front-facing camera, wherein the antenna comprises:
   a metal frame comprising a radiation frame and a grounding frame separately arranged with respect to the radiation frame; the radiation frame comprising a first grounding point;
   a mainboard comprising a system ground and a feeding end, the system ground comprising a first ground point and a second ground point,
   a diversity antenna unit comprising a feeding point and a second grounding point; and
   a conductive bracket,
   wherein the front-facing camera is mounted on the mainboard; a gap is defined between the radiation frame and the grounding frame, and the first ground point and the second ground point are at two opposite sides of the front-facing camera, respectively; the feeding point is connected with the feeding end, and the second grounding point is connected with the system ground; one end of the conductive bracket is connected with the first ground point, and the other end of the conductive bracket is connected with the second ground point, so that the conductive bracket crosses the front-facing camera;
   the conductive bracket comprises a strip-like section, a projection of the strip-like section overlaps with a projection of the top end in the thickness direction of the mainboard, and a width of the strip-like section is 2 mm.

2. The antenna as described in claim 1, wherein one end of the front-facing camera close to the radiation frame is a top end, and the conductive bracket is opposite to the top end in a thickness direction of the mainboard.

3. The antenna as described in claim 1, wherein an extending direction of the strip-like section is parallel to a width direction of the mobile terminal.

4. The antenna as described in claim 1, further comprising:
   a first spring pin,
   wherein the conductive bracket is connected with the first ground point by the first spring pin.

5. The antenna as described in claim 4, wherein one end of the first spring pin is welded at the first ground point, and the other end of the first spring pin is connected with the conductive bracket.

6. The antenna as described in claim 1, further comprising:
   a second spring pin,
   wherein the conductive bracket is connected with the second ground point by the second spring pin, and the second spring pin is connected with the first grounding point.

7. The antenna as described in claim 6, wherein one end of the second spring pin is connected with the conductive bracket by hot-melting, and the other end of the second spring pin is respectively connected with the first grounding point and the mainboard.

8. The antenna as described in claim 1, further comprising:
   a tuning switch,
   wherein the system ground comprises a third ground point, the radiation frame is connected with the third ground point by the tuning switch, and the second grounding point is connected with the third ground point.

9. A mobile terminal, comprising the antenna as described in claim 1.

* * * * *